US 9,743,279 B2

(12) United States Patent
Rachuri et al.

(10) Patent No.: US 9,743,279 B2
(45) Date of Patent: Aug. 22, 2017

(54) SYSTEMS AND METHODS FOR DEVICE BASED AUTHENTICATION

(71) Applicant: Samsung Electronics Co., Ltd., Suwon-si, Gyeonggi-do (KR)

(72) Inventors: Kiran K. Rachuri, San Jose, CA (US); Vijay Srinivasan, San Jose, CA (US); Emmanuel Munguia-Tapia, Newark, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 14/488,087

(22) Filed: Sep. 16, 2014

(65) Prior Publication Data

US 2016/0080936 A1   Mar. 17, 2016

(51) Int. Cl.
*G06F 21/00* (2013.01)
*H04W 12/06* (2009.01)
*G06F 21/31* (2013.01)
*H04L 29/06* (2006.01)

(52) U.S. Cl.
CPC ........... *H04W 12/06* (2013.01); *G06F 21/31* (2013.01); *H04L 63/0861* (2013.01)

(58) Field of Classification Search
CPC ..... H04L 63/0861; G06F 21/31; G06F 21/32; H04W 12/06
See application file for complete search history.

(56) References Cited

U.S. PATENT DOCUMENTS

| 7,324,806 | B2 * | 1/2008 | Tomita ............... H04L 63/0869 455/41.2 |
| 7,474,592 | B2 * | 1/2009 | Lyon ................... G04G 17/083 368/10 |
| 7,711,961 | B2 * | 5/2010 | Fujinuma ............... G06F 21/32 340/5.82 |
| 7,925,022 | B2 | 4/2011 | Jung et al. |
| 8,112,066 | B2 | 2/2012 | Ben Ayed |
| 8,166,523 | B2 * | 4/2012 | Ezaki ..................... G06F 21/32 380/247 |
| 8,290,434 | B2 | 10/2012 | Piemonte et al. |
| 8,371,501 | B1 | 2/2013 | Hopkins |
| 8,467,770 | B1 | 6/2013 | Ben Ayed |
| 8,578,454 | B2 | 11/2013 | Grim |

(Continued)

OTHER PUBLICATIONS

Joanna Lumsden et al., A Paradigm Shift: Alternative Interaction Techniques for Use with Mobile & Wearable Devices, Oct. 6-9, 2003, ACM, pp. 197-210.*

(Continued)

*Primary Examiner* — Luu Pham
*Assistant Examiner* — Fahimeh Mohammadi

(57) ABSTRACT

In some embodiments, computer implemented methods, systems, and non-transitory computer readable media determine a first comparison value based on a first comparison between a first sensor signature associated with first set of sensor data of a first device in a first context and a second sensor signature associated with second set of sensor data of a second device. The first comparison is associated with a first authentication type. It is determined whether the first comparison value satisfies a first threshold. It is determined that a user should be authenticated on the second device based on satisfaction of the first threshold.

16 Claims, 6 Drawing Sheets

(56) References Cited

U.S. PATENT DOCUMENTS

| | | | |
|---|---|---|---|
| 8,625,796 B1 | 1/2014 | Ben Ayed | |
| 8,634,777 B2 | 1/2014 | Ekbatani et al. | |
| 2003/0197593 A1* | 10/2003 | Siegel | G07C 9/00087 340/5.52 |
| 2004/0123106 A1 | 6/2004 | D'Angelo et al. | |
| 2004/0143515 A1 | 7/2004 | Kawasaki | |
| 2006/0226950 A1 | 10/2006 | Kanou et al. | |
| 2008/0027842 A1 | 1/2008 | Suginaka | |
| 2008/0216171 A1* | 9/2008 | Sano | H04L 9/32 726/19 |
| 2009/0021350 A1* | 1/2009 | Hatta | G08B 13/1418 340/10.1 |
| 2009/0146947 A1* | 6/2009 | Ng | G06F 3/014 345/156 |
| 2010/0040293 A1 | 2/2010 | Hermann et al. | |
| 2011/0013814 A1* | 1/2011 | Ivanov | G06K 9/00013 382/124 |
| 2012/0300988 A1* | 11/2012 | Ivanov | G06K 9/00006 382/115 |
| 2012/0317024 A1* | 12/2012 | Rahman | G06Q 30/02 705/42 |
| 2013/0058197 A1 | 3/2013 | Yonekura | |
| 2013/0090088 A1* | 4/2013 | Chevsky | H04L 63/0876 455/411 |
| 2013/0237155 A1* | 9/2013 | Kim | H04W 12/06 455/41.2 |
| 2013/0263284 A1 | 10/2013 | Black et al. | |
| 2014/0058935 A1* | 2/2014 | Mijares | G06Q 20/352 705/41 |
| 2014/0089672 A1* | 3/2014 | Luna | H04L 9/3231 713/186 |
| 2014/0089673 A1* | 3/2014 | Luna | H04L 63/0861 713/186 |
| 2014/0267258 A1* | 9/2014 | Yang | G06T 15/405 345/422 |
| 2014/0282877 A1* | 9/2014 | Mahaffey | H04L 63/0853 726/3 |
| 2015/0035643 A1* | 2/2015 | Kursun | G07C 9/00158 340/5.52 |
| 2015/0161371 A1* | 6/2015 | Hoshi | G06F 21/35 726/19 |
| 2015/0347738 A1* | 12/2015 | Ulrich | G06F 21/35 726/17 |
| 2015/0379255 A1* | 12/2015 | Konanur | G06F 21/35 726/19 |
| 2016/0277891 A1* | 9/2016 | Dvortsov | H04W 4/008 |

OTHER PUBLICATIONS

Sampo Ojala et al., Wearable Authentication Device for Transparent Login in Nomadic Applications Environment, Nov. 7-9, 2008, IEEE, pp. 1-6.*
Alexandros Pantelopoulos et al., A Survey on Wearable Sensor-Based Systems for Health Monitoring and Prognosis, Jan. 2010, IEEE, vol. 40, No. 1, pp. 1-12.*
Kai Wun Lin et al., A Wearable Stereo Vision System for Visually Impaired, Aug. 5-8, IEEE, pp. 1423-1428.*
Bionym Inc., "Nymi," white paper, Nov. 19, 2013.
Jansen, Wayne et al., "Proximity-Based Authentication for Mobile Devices," Proceedings of the 2005 International on Security and Management (SAM 2005), CSREA Press, pp. 398-404, Jun. 2005.
Lester, Jonathan et al., "'Are You with Me?'—Using Accelerometers to Determine if Two Devices are Carried by Same Person," Pervasive Computing, Lecture Notes in Computer Science, vol. 3001, pp. 33-50, 2004.
Scannell, Adin et al., "Proximity-Based Authentication for Mobile Devices," International Journal of Security and vol. 4, Nos. 1/2, pp. 4-16, Feb. 2009.
Spencer, Ben, "Mobile Users Can't Leave Their Phone Alone for Six Minutes and Check It Up to 150 Times a Day," Daily Mail, Feb. 10, 2013 [retrieved online at http://www.dailymail.co.uk/news/article-2276752/Mobile-users-leave-phone-minutes-check-150-times-day.html on Jan. 29, 2015].

* cited by examiner

SYSTEMS AND METHODS FOR DEVICE BASED AUTHENTICATION

FIELD OF THE INVENTION

The present technology relates to the field of electronic wearable devices and mobile devices. More particularly, the present technology relates to communications involving wearable devices and mobile devices.

BACKGROUND

The functionality of electronic mobile devices has increased over time. Various types of mobile devices can perform myriad tasks. For example, mobile computers, such as laptop computers and computing tablets, can now perform all or nearly all of the features and utilities traditionally provided by personal computers. Moreover, these mobile devices are associated with increasingly modest tradeoffs in relation to communication ease (e.g., access, bandwidth, and reliability) with other devices. As another example, smart phones likewise are growing in popularity due to their broadening array of capabilities. Their capabilities are approaching the function of laptop computers and computing tablets.

Although use of mobile computers and smart phones increasingly raises fewer issues relating to computing power, at least one shortcoming continues to be associated with both types of devices: form factor. While the steady diminution in form factor of these device types has provided many advantages, their size continues to present disadvantages in certain circumstances. In this regard, true computing mobility for a user is often not realized when the user is left to tote a mobile computer or even a smartphone in certain situations. For example, a physically active user could find her freedom of movement unduly impacted by the weight and volume of a carried computing tablet. As another example, a user requiring significant computing mobility could be undesirably constrained if she needs to carry a smartphone. These concerns, in part, have prompted the introduction of wearable electronic devices to enhance user freedom.

SUMMARY

To perform authentication of a user on one or more mobile devices using a wearable device, computer implemented methods, systems, and non-transitory computer readable media, in an embodiment, determine a first comparison value based on a first comparison between a first sensor signature associated with first set of sensor data of a first device in a first context and a second sensor signature associated with second set of sensor data of a second device. The first comparison is associated with a first authentication type. It is determined whether the first comparison value satisfies a first threshold. It is determined that a user should be authenticated on the second device based on satisfaction of the first threshold.

In an embodiment, a second comparison value is determined based on a second comparison between the first sensor signature associated with the first set of sensor data of the first device and a third sensor signature associated with the first context. The second comparison is associated with a second authentication type. It is determined whether the second comparison value satisfies a second threshold. It is determined that the user should be authenticated on the second device based on satisfaction of the second threshold.

In an embodiment, at least one of the first authentication type and the second authentication type are performed at least one of continuously or periodically.

In an embodiment, at least one of the first authentication type and the second authentication type is performed at irregular intervals.

In an embodiment, a password is provided to the second device to authenticate the user on the second device in response to satisfaction of the second threshold.

In an embodiment, a command is provided to the second device to log off the user from the second device when the second threshold is not satisfied.

In an embodiment, the first threshold is updated based on the first comparison value. The second threshold is updated based on the second comparison value.

In an embodiment, a password is provided to the second device to authenticate the user on the second device in response to satisfaction of the first threshold.

In an embodiment, a command is provided to the second device to log off the user from the second device when the first threshold is not satisfied.

In an embodiment, the first device is a wearable device.

In an embodiment, the second device is a mobile device.

In an embodiment, the first comparison is performed.

In an embodiment, the first threshold is updated based at least in part on the first comparison.

In an embodiment, the first device is a wearable device and the wearable device includes the system.

In an embodiment, a third comparison value is determined based on a third comparison between the first sensor signature associated with the first set of sensor data of the first device in the first context and a third sensor signature associated with third set of sensor data of a third device. The third comparison is associated with the first authentication type. It is determined whether the third comparison value satisfies a third threshold. It is determined that the user should be authenticated on the third device based on satisfaction of the third threshold.

In an embodiment, at least one of the first set of sensor data and the second set of sensor data is provided by at least one of an 3-axis accelerometer sensor, a gyroscope, a microphone, a galvanic skin response (GSR) sensor, a pressure sensor, a temperature sensor, a GPS sensor, a Wi-Fi radio, and a Bluetooth radio.

In an embodiment, the second set of sensor data is received from the second device over a communications link including at least one of Wi-Fi, Bluetooth, and NFC.

In an embodiment, it is detected that the user has worn the first device

Many other features and embodiments of the invention will be apparent from the accompanying drawings and from the following detailed description.

Figure 1:
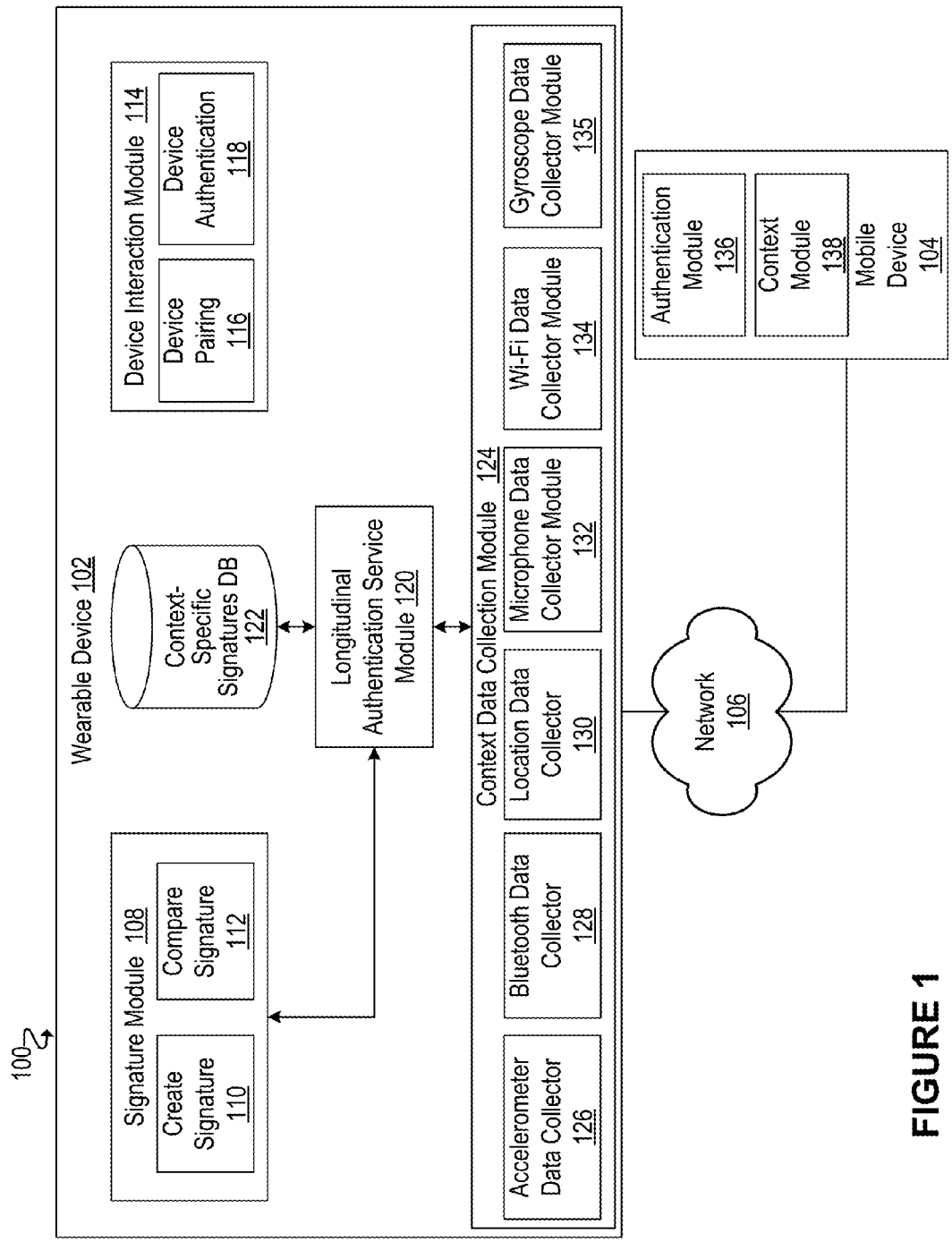
FIG. 1 illustrates an example system to authenticate one or more mobile devices of a user using a wearable device of the user in accordance with an embodiment of the present disclosure.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Wearable Device Based Authentication

User authentication on mobile devices, such as smartphones, is a crucial security feature as users typically store a large amount of private data on their mobile devices. Further, it has been reported that users can access their smartphones as many as 150 times a day. Therefore, authenticating each time a user has to access her mobile device can be a significant burden on the user. Conventional solutions to this problem may involve use of a password pattern or a finger print sensor. However, these techniques are involved and require dedicated, manual intervention by the user. The problem is exacerbated by the growing trend that a user typically owns multiple mobile devices these days (e.g., a smartphone, a tablet) and each device has its own authentication method (such as patterns, passwords etc.).

Accordingly, it would be desirable to provide an efficient technique to authenticate a user on her mobile devices. In particular, it would be desirable to provide a technique to allow a user to authenticate herself with minimal manual burden. In addition, it would be advantageous to provide a technique that provides authentication ease for myriad types of mobile devices. It would be further important to provide a technique that provides these features without compromising security of the user.

The present disclosure provides various data streams (e.g., sensor data streams) between a user's wearable device (e.g., watch, glasses, goggles, bands, ring, bracelets, pendant, other smart devices that can be carried on the body, etc.) and the user's mobile devices (e.g., smartphone, tablet, PDA, etc.) that are in physical proximity to authenticate the user into her mobile devices. The wearable device and the mobile devices can communicate over suitable protocols (e.g., Bluetooth, Wi-Fi, NFC, etc.). An authentication system of the present disclosure includes two types of authentication. Each authentication type involves an associated type of comparison of sensor signatures for authenticating the user into her mobile devices.

When the user wears the wearable device, the authentication system detects this event using multi-modal sensing using one or more sensors, such as an accelerometer, gyroscope, galvanic skin response (GSR) sensor, temperature sensor, etc. Then, each of the user's mobile devices can be paired with the user's wearable device using, for example, Bluetooth or Wi-Fi. After pairing, the wearable device can request that the user enter on the wearable device passwords for each of the mobile devices that was paired. The request for passwords in this manner is a one-time setup phase that is initiated when the user puts on the wearable device. Requesting and receiving passwords during the setup phase ensure that the user who has put on the wearable device is the authorized user of the wearable device. After the setup phase, the user is not required to enter passwords as long as she wears the wearable device.

In a first authentication type of the authentication system, while the user interacts with a mobile device, the mobile device captures the sensor data (or sets of sensor data) from sensors (e.g., 3-axis accelerometer sensor, gyroscope, microphone, galvanic skin response (GSR) sensor, pressure sensor, temperature sensor, GPS sensor, Wi-Fi radio, Bluetooth radio, etc.) of the mobile device, and sends related sensor signals to the wearable device. The wearable device receives the sensor signals from the mobile device and further captures sensor signals from the wearable device. The wearable device performs a correlation or similarity analysis between the sensor signals, or associated sensor signatures, from both the mobile device and the wearable device to infer whether the user wearing the wearable device is interacting with the mobile device or not. If an inference is made that the user wearing the wearable device is interacting with the mobile device, then the user is logged into her mobile device (or not logged off her mobile device). If an inference is made that the user wearing the wearable device is not interacting with the mobile device, then the user is logged off her mobile device (or locked out of the mobile device). The first authentication type ensures that the authorized user is interacting with the mobile device, i.e., the user who is wearing the wearable device is same as the user who is interacting with the mobile device. The first authentication type may be referred to herein as interaction based authentication.

In a second authentication type of the authentication system, the wearable device learns and stores global signatures of sensor signals with respect to various contexts of the user. The wearable device builds different global signatures for various contexts that, for each context, represent quintessential conditions that are intended to uniquely characterize the context in relation to the user. By comparing the sensor signature for current sensor signals associated with the wearable device in a current context with a global signature of the user (i.e., typical signal patterns of the user) for the current context, the wearable device infers whether the authorized user is wearing the wearable device or not, and then accordingly authenticates the user on her mobile devices (or does not log off the user from the mobile device) or logs off the user from her mobile devices. The second step provides a validation to ensure that the authorized user is wearing the wearable device or otherwise logs off the user from the mobile devices by using the historical sensor signal values corresponding to the user's current context. The second step may be referred to as context based authentication.

The two authentication types of the authentication system are performed automatically. The two authentication types help to increase robustness by allowing only the authorized user to unlock and interact with her mobile devices. Also, since the entire process is automatic, the burden on the user is considerably reduced compared to conventional techniques. For example, when a user wears her wearable device in the morning, the wearable device may ask for authentication once, after which her mobile devices will not ask for authentication as long as she wears the watch and interacts with her mobile devices. When the user takes off the wearable device, the authentication process is terminated, and also the user is logged off from all the mobile devices. The authentication process can restart each time a person wears the wearable device.

FIG. 1 illustrates an example system 100 to authenticate one or more mobile devices of a user using a wearable device of the user in accordance with an embodiment of the present disclosure. The system 100 is an authentication system including a wearable device 102 (e.g., watch, glasses, goggles, bands, ring, pendant, other smart devices that can be carried on the body, etc.) of a user, a mobile device 104 (e.g., smartphone, tablet, PDA, wearable device, etc.) of the user, and a network 106 communicatively connecting the wearable device 102 and the mobile device 104. Although only one mobile device 104 is shown in FIG. 1, it should be appreciated that various embodiments of the present disclosure include a plurality of mobile devices in communication with the wearable device 102. The components (e.g., modules) shown in this figure and all figures herein are exemplary only, and other implementations may include additional, fewer, different, or integrated components. Some components may not be shown so as not to obscure relevant details.

The wearable device 102 contains modules related to the operation of the interaction based authentication and the context based authentication including, for example, collecting data, maintaining context specific signatures, generating interaction data, and performing sensor signature comparisons. The mobile device 104 is primarily responsible for collecting local context data, providing sensor signal information to the wearable device 102, and acting on the commands from the wearable device 102 such as log in commands or log off commands.

The wearable device 102 may include a signature module 108 including a create signature module 110 and a compare signature module 112; a device interaction module 114 including a device pairing module 116 and a device authentication module 118; a longitudinal authentication service module 120; a context specific signatures database 122; and a context data collection module 124 including an accelerometer data collector module 126, a Bluetooth data collector module 128, a location data collector module 130, a microphone data collector module 132, a Wi-Fi data collector module 134, and a gyroscope data collector module 135.

The longitudinal authentication service module 120 is a primary service that runs on the wearable device 102. The longitudinal authentication service module 120 may initiate comparisons performed in the interaction based authentication and the context based authentication, which are discussed in more detail herein. The longitudinal authentication service module 120 may receive sensor signals from the context data collection module 124 relating to sensor data from the wearable device 102 and provide these sensor signals to the signature module 108. The longitudinal authentication service module 120 also may receive sensor signals from the device interaction module 114 relating to sensor data from the mobile device 104 and provide these sensor signals to the signature module 108. The longitudinal authentication service module 120 also may receive global, contextual signatures of the user from the context specific signatures database 122 relating to context based sensor data from the wearable device 102 and provide the contextual signatures to the signature module 108.

The signature module 108 is responsible for creating sensor signatures from the sensor signals and/or sensor data and for comparing sensor signatures. In particular, the create signature module 110 may create sensor signatures based on the sensor signals and/or sensor data provided by various sensors of the wearable device 102 and the mobile device 104. The sensors may perform multi-modal sensing using one or more types of sensors including but not limited to an accelerometer, gyroscope, microphone, galvanic skin response (GSR) sensor, pressure sensor, temperature sensor, GPS, Wi-Fi radio, Bluetooth radio, etc. In some embodiments, the signature module 108 may convert different types of sensor data from different types of sensors into a composite representation (e.g., tuple, arrays, matrices, etc.) having values to create a sensor signature associated with the sensor data. Each value in such a composite representation may reflect the value of sensor data for a particular type of sensor.

The compare signature module 112 may compare sensor signatures created by the create signature module 110 or global signatures from the context specific signatures database 122 in the interaction based authentication and the context based authentication. The comparison performed in the interaction based authentication relates to a comparison of one or more sensor signatures of the sensor signals from the mobile device 104 and one or more sensor signatures of the sensor signals from the wearable device 102. The sensor signatures may be compared using any one or more of conventional correlation or similarity analysis techniques to determine whether the user interacting with the mobile device 104 is the authorized user. The comparison performed in the context based authentication relates to a comparison of the sensor signature for a current sensor signal in a current context and a global, contextual signature of the user (i.e., typical signal patterns of the user based on her historical data) for the current context. Likewise, the sensor signatures may be compared using any one or more of conventional correlation or similarity analysis techniques to determine whether the user wearing the wearable device 102 is the authorized user. In some embodiments, the distance between sensor signatures may be determined based on their Euclidian distance. In both interaction based authentication and context based authentication, the comparisons may involve the determination of the Euclidian distance between sensor signatures in some embodiments. In both interaction based authentication and context based authentication, the result of the comparison may be a comparison value (that is a representation of the distance between the compared signatures).

In some embodiments, the types of sensor data captured from the wearable device 102 and the types of sensor data captured from the mobile device 104 may be different. The types of sensor data may be different because they may be produced by different types of sensors. Differences in the types of sensor data captured from the wearable device 102 and the sensor data captured from the mobile device 104 may be accounted for prior to comparison of their corresponding sensor signatures to facilitate comparison. For example, the signature module 108 may normalize the sensor signals corresponding to sensor data captured from the wearable device 102 and the sensor signals corresponding to sensor data captured from the mobile device 104 so that only the types of sensor signals common to the wearable device 102 and the mobile device 104 are used to create sensor signatures. Such normalization may facilitate comparison of sensor signatures.

The context data collection module 124 may assist in collecting data from the sensors of the wearable device 102. The sensor data provided by an accelerometer is received by the accelerometer data collector module 126. The sensor data provided by Bluetooth functionality is received by the Bluetooth data collector module 128. The sensor data provided by GPS functionality is received by the location data collector module 130. The sensor data provided by a microphone is received by the microphone data collector module 132. The sensor data provided by Wi-Fi functionality is received by the Wi-Fi data collector module 134. The sensor data provided by gyroscope functionality is received by the gyroscope data collector module 135. The collective sensor data received by the accelerometer data collector module 126, the Bluetooth data collector module 128, the location data collector module 130, the microphone data collector module 132, the Wi-Fi data collector module 134, and the gyroscope data collector module 135 is provided by the context data collection module 124 to the longitudinal authentication service module 120. In various embodiments, sensor data provided by types of sensors other than as show in FIG. 1 can be provided to a context data collection module for provision to the longitudinal authentication service module 120.

The context specific signatures database 122 may maintain sensor data collected by the context data collection module 124, may associate the sensor data with contextual information, and may contain related sensor signatures created by the signature module 108. The context specific signatures database 122 also may maintain threshold values to be used in the interaction based authentication and the context based authentication. The threshold values represent a degree of correlation or similarity between sensor signatures from the wearable device and the mobile device that is indicative of circumstances in which a user is properly authenticated. The threshold value, when satisfied (i.e., when it is determined that both the signatures are similar), can be characterized as a confidence level reflecting circumstances in which it can be inferred to a desired degree that the wearable device 102 should log in the user to (or not log off the user from) the mobile device 104. In addition, the threshold value, when not satisfied, can be characterized as a confidence level reflecting circumstances in which it can be inferred to a desired degree that the wearable device 102 should log off the user from (or not log on the user to) the mobile device 104. The threshold values are discussed in more detail herein.

The device interaction module 114 may communicate with the mobile device 104. The device interaction module 114 also may receive from the mobile device 104 the context data relating to the mobile device 104 in the form of sensor signals. The device pairing module 116 of the device interaction module 114 may perform the initial pairing of the wearable device 102 and the mobile device 104 (using standard Bluetooth or Wi-Fi based communication techniques). The device authentication module 118 may provide user names, passwords, and other credentials to the mobile device 104 to allow the user to log in to the mobile device 104. The device authentication module 118 also may provide a command to the mobile device 104 to log off when a comparison performed in the interaction based authentication or the context based authentication indicates that logging off the user is warranted. The device authentication module 118 may also function as a communication interface to receive sensor data provided by the mobile device 104.

The mobile device 104 may communicate with the wearable device 102. The mobile device 104 may include an authentication module 136 and a context module 138. The authentication module 136 may execute commands provided by the device interaction module 114 of the wearable device 102. The commands may include logging on or logging off the user based on the results of comparisons performed in the interaction based authentication and the context based interaction (i.e., when the distance or similarity between the signatures is higher than the threshold value). The context module 138 may collect sensor data from the sensors of the mobile device. The context module 138 may provide the sensor data to the device interaction module 114 of the wearable device 102.

The network 106 may be a communications link based on standard technologies and protocols. In some embodiments, the network 106 can be based on one or more communication standards such as Bluetooth, Wi-Fi, NFC, etc. In other embodiments, the network 106 can be based on one or more other communication standards such as Ethernet, 702.11, worldwide interoperability for microwave access (Wi-MAX), 3G, 4G, CDMA, GSM, LTE, digital subscriber line (DSL), etc.

Figure 2:
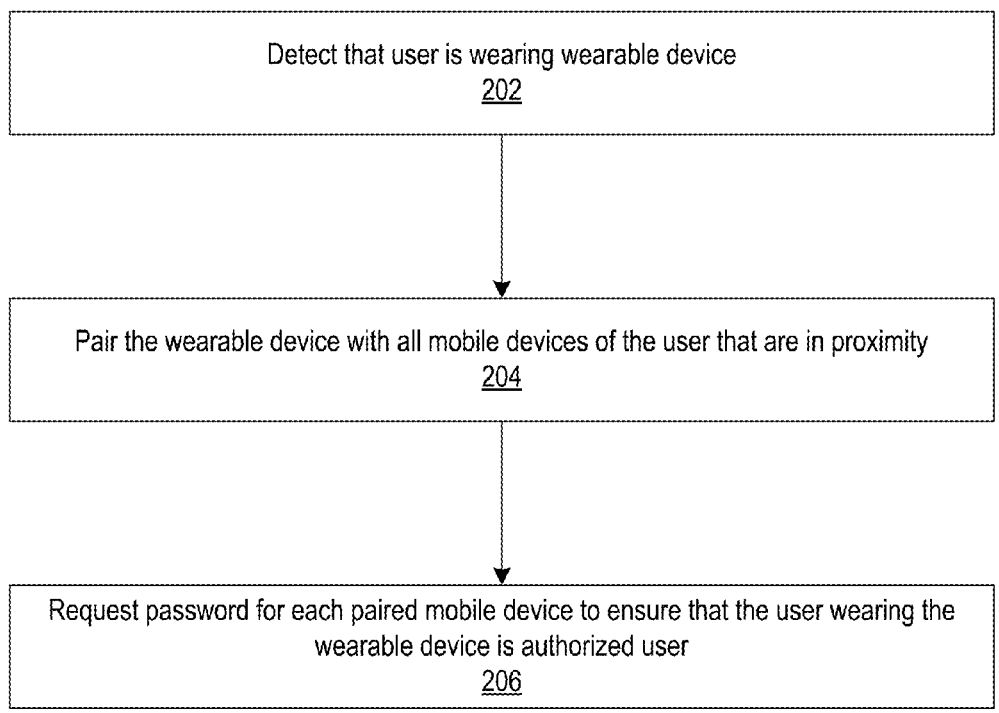
FIG. 2 illustrates an example method of an initial setup phase in accordance with an embodiment of the present disclosure.

FIG. 2 illustrates an example method 200 of an initial setup phase in accordance with an embodiment of the present disclosure. The method 200 is an initial setup phase that can be invoked when a user has put on or worn the wearable device 102. At block 202, it is detected that the user has worn the wearable device 102. Such detection can be performed or facilitated by use of multi-modal sensing using sensors, such as a galvanic skin response (GSR) sensor, accelerometer, gyroscope, temperature sensor, etc. At block 204, the wearable device is paired with all mobile devices of the user that are in proximity. The pairing process is a conventional technique that may involve provision of Bluetooth identifiers or Wi-Fi identifiers or MAC addresses of the mobile device 104 to the wearable device 102. The wearable device 102 can be paired with all pre-configured mobile devices of the user. At block 206, a password is requested for each paired mobile device to ensure that the user wearing the wearable device is an authorized user. Upon providing correct authentication details for all the mobile devices and completion of the method 200, each time the user interacts with any paired mobile device 104, the user can be automatically authenticated on to all her mobile devices 104.

Figure 3:
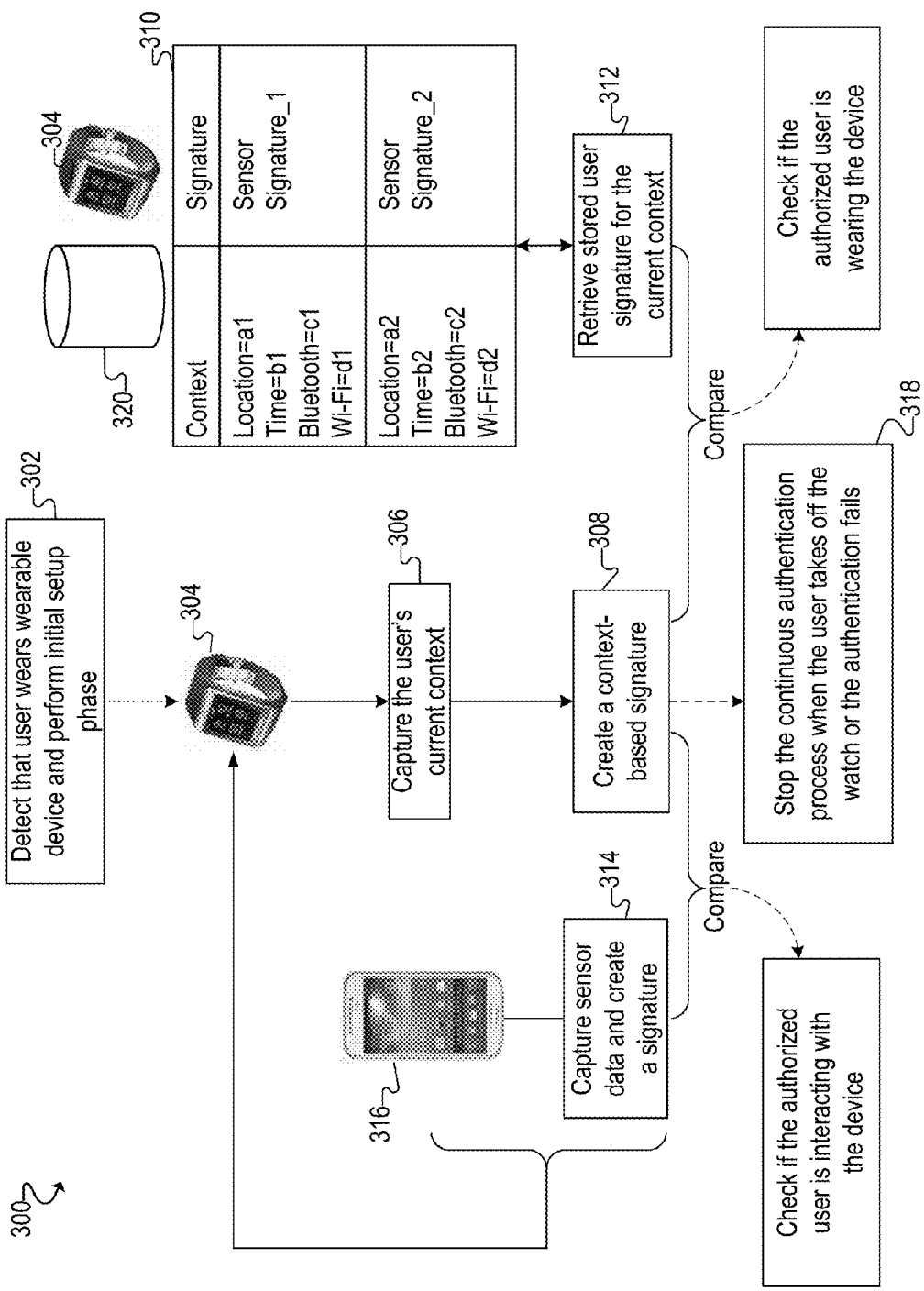
FIG. 3 illustrates an example method of interaction based authentication and context based authentication in accordance with an embodiment of the present disclosure.

FIG. 3 illustrates an example method 300 of interaction based authentication and context based authentication in accordance with an embodiment of the present disclosure. The steps of the method 300 may be performed by corresponding modules in FIG. 1, as described in more detailed herein. As with the example methods shown in all of the figures, it should be appreciated that there can be additional, fewer, or alternative steps performed in similar or alternative orders, or in parallel, within the scope of the various embodiments. The method 300 uses a two-step comparison involving interaction based authentication and context based authentication to automatically authenticate a user into her mobile devices. At block 302, a user wears a wearable device 304, triggering an initial setup phase, as described in more detail herein. In some embodiments, the wearable device 304 is an example of the wearable device 102. At block 306, the current context of the user is captured. The current context of the user may be reflected in sensor data provided by sensors of a mobile device 316. At block 308, a context based sensor signature may be created based on the sensor data.

At block 314, sensor data from sensors of a mobile device 316 may be captured and a sensor signature may be created from the sensor data. In some embodiments, the mobile device 316 is an example of the mobile device 104.

At block 312, stored data relating to global, contextual signatures of the user for a current context is retrieved from a database 320 of the wearable device 304. In some embodiments, the database 320 is an example of the context specific signatures database 122. The stored data may include context information and signatures for various contexts. The contextual information may include contextual parameters relating to different types of sensor data, such as location, time, Bluetooth, Wi-Fi, microphone, accelerometer, gyroscope, etc. The stored data may include values associated with the contextual parameters for a particular context. The stored data may include a sensor signature for the particular context.

As just one example, an example record 310 of the database 320 may include information relating to a first context. The first context may be denoted, for example, as Context_1. Context_1 may be associated with sensor data provided by, for example, location, time, Bluetooth, and Wi-Fi. In other examples, more or fewer types of sensors or related data may be used to characterize other contexts, such as application usage, phone calls or communication patterns, and proximity sensor values. In particular, Context_1 may characterized by the following: Location=a1, Time=b1, Bluetooth=c1, Wi-Fi=d1, where a1, b1, c1, and d1 may be one or more of real numbers, Boolean numbers, integers, or any other suitable values. The database 320 may store a sensor signature for Context_1 as Sensor Signature_1. Sensor Signature_1 may be stored as a tuple, vector, array, matrix, or other suitable type of representation of the parameter values associated with Context_1 to allow the sensor signature to be compared with other sensor signatures. The example record 310 similarly reflects information relating to a second context associated with a sensor signature Sensor Signature_2. Any number of different contexts and associated information may be stored in the database 320.

Two step authentication is performed by comparison of sensor signatures. In the first step, interaction based authentication is performed by a comparison of the sensor signatures created at block 314 and the sensor signatures created at block 308. If the two sensor signatures satisfy a similarity threshold (e.g., if the distance of between the sensor signatures is less than the threshold), then the user is logged into the mobile device 316 or remains logged in to the mobile device 316. If the similarity threshold is not satisfied, the user is logged off of the mobile device 316 or remains logged off from the mobile device 316. In the second step, context based authentication is performed by a comparison of the sensor signature created at block 308 with the global signature retrieved at block 312. Likewise, if the two sensor signatures satisfy a similarity threshold, the user is logged into the mobile device 316 or remains logged in to the mobile device 316. If the similarity threshold is not satisfied, the user is logged off of the mobile device 316 or remains logged off from the mobile device 316. In some embodiments, the interaction based authentication and the context based authentication, and their associated comparisons, may be performed continuously or periodically. At block 318, the continuous or periodic authentication determinations and comparisons are stopped when the user removes the wearable device 304 or when the comparisons do not result in satisfaction of the similarity thresholds.

In some embodiments, authentication of the user on the mobile device 316 may be one step only or two steps. In some embodiments, authentication of the user may involve interaction based authentication only. In some embodiments, authentication of the user may involve context based authentication only. In some embodiments, authentication of the user may involve parallel or sequential use of interaction based authentication and context based authentication.

In some embodiments, each comparison performed in the interaction based authentication and the context based authentication may be performed continuously. In some embodiments, each comparison performed in the interaction based authentication and the context based authentication may be performed periodically at regular intervals (e.g., every 5 seconds, every minute, every 30 minutes, every hour) or irregular intervals (e.g., whenever context changes as determined by the sensor signal values).

Sensor data and context are captured from the wearable device 304 and the mobile device 316. Examples of sensor data that could be used to create sensor signatures are outlined in Table 1. These examples of sensor data may be used to create sensor signatures that can be compared in the interaction based authentication and the context based authentication. Other sensor data associated with types of sensors other than those listed below may be used in some embodiments.

TABLE 1

| SENSOR | SIGNATURE DATA |
| --- | --- |
| Microphone | Amplitude levels, Time-domain and frequency domain features extracted from microphone audio data |
| Accelerometer | Magnitude of acceleration, and change in acceleration patterns, Time-domain and frequency domain features extracted from accelerometer data |
| Gyroscope | Orientation data |
| Bluetooth | Devices seen and received signal strength values (e.g., RSSI) |
| Wi-Fi | Devices and access points seen and received signal strength values (e.g., RSSI) |
| GPS | Location, indoors/outdoors, speed, etc. |

Figure 4:
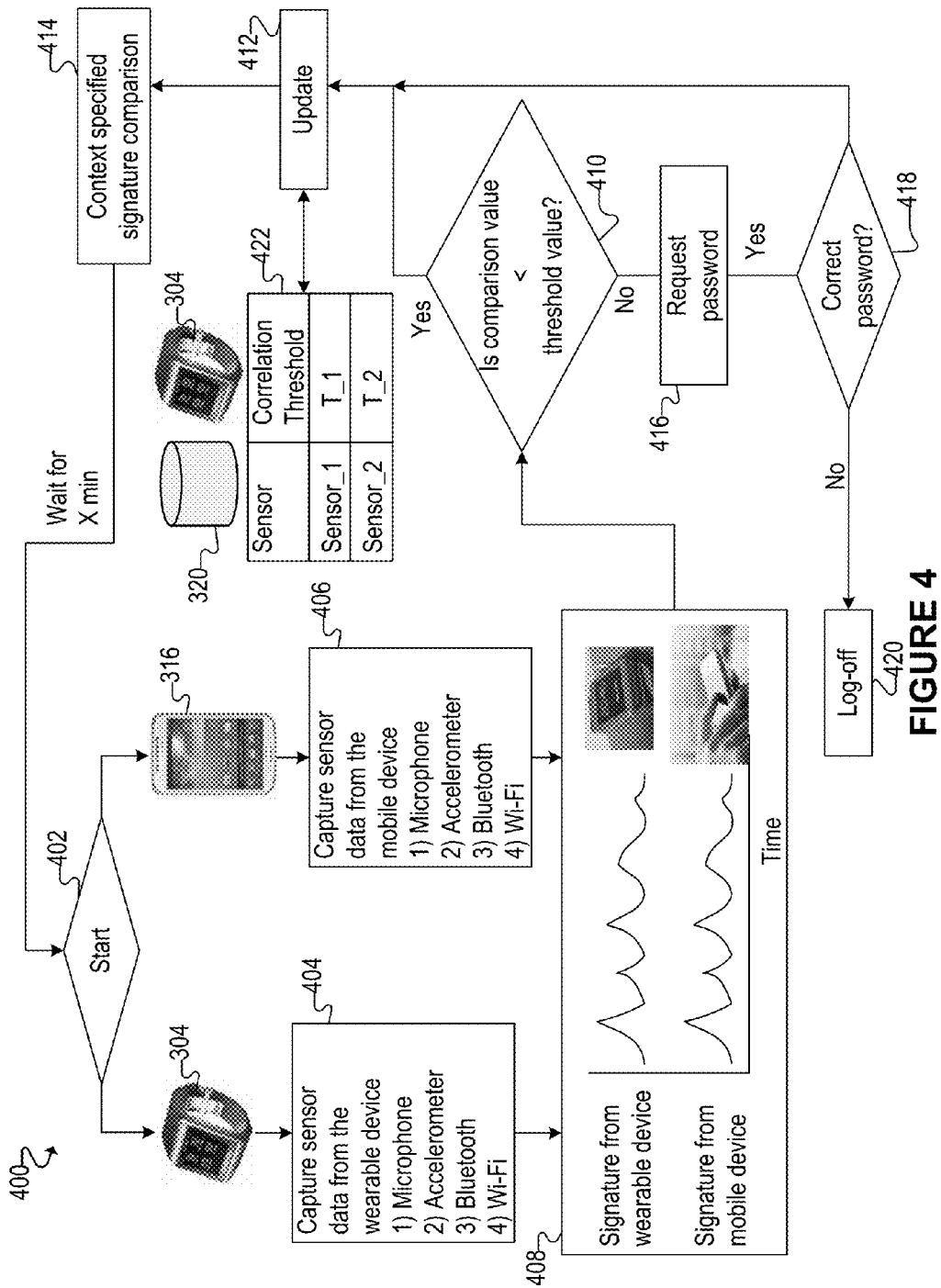
FIG. 4 illustrates an example method of performing interaction based authentication in accordance with an embodiment of the present disclosure.

FIG. 4 illustrates an example method 400 of performing interaction based authentication in accordance with an embodiment of the present disclosure. The steps of the method 400 may be performed by corresponding modules in FIG. 1, as described in more detailed herein. At block 402, the method 400 starts. At block 404, the wearable device 304 captures sensor data from the wearable device 304. Examples of sensor data from the wearable device 304 include but are not limited to sensor data from sensors, such as a microphone, GPS, accelerometer, gyroscope, Bluetooth, and Wi-Fi. At block 406, the mobile device 316 captures sensor signals associated with the sensor data from the mobile device 316. Examples of sensor data from the mobile device 316 include but are not limited to sensor data from sensors, such as a microphone, GPS, accelerometer, gyroscope, Bluetooth, and Wi-Fi. The sensor data captured at blocks 404 and 406 may include those reflected in Table 1 herein. The sensor signals associated with sensor data captured by the mobile device 316 are provided to the wearable device 304.

In some embodiments, the types of sensor data captured from the wearable device 304 and the types of sensor data captured from the mobile device 316 may be different. The types of sensor data may be different because they may be produced by different types of sensors or the wearable device and mobile device may have different types of sensors. Differences in the types of sensor data captured from the wearable device 304 and the sensor data captured from the mobile device 316 may be accounted for prior to their comparison to facilitate comparison. For example, the signature module 108 may normalize the sensor signals associated with sensor data captured from the wearable device 304 and the sensor signals associated with sensor signals captured from the mobile device 316 so that only the types of sensor signals common to the wearable device 304 and the mobile device 316 are used to create sensor signatures. Such normalization may facilitate comparison of sensor signatures.

At block 408, sensor signatures associated with the sensor signals associated with the wearable device 304 and sensor signatures associated with the mobile device 316 are compared. In some embodiments, sensor signatures associated with sensor data captured from one type of sensor of the wearable device 304 and sensor signatures associated with sensor data captured from the same type of sensor of the mobile device 316 are compared for each type of sensor. The comparison of sensor signatures may result in a comparison value. This comparison value is a representation of the similarity (e.g., in terms of distance—smaller the distance closer are the sensor signatures) between the two sensor signatures. In some embodiments, composite representations of sensor signatures associated with different types of sensors of the wearable device 304 and composite representations of sensor signatures associated with different types of sensors of the mobile device 316 are compared.

At block 410, it is determined whether the comparison value is less than a threshold value. In some embodiments, the threshold value may be based on the type of sensor associated with the compared sensor signatures. If the result of block 410 is yes, at block 412 a database of threshold values corresponding to sensors is updated. In some embodiments, the database may be the database 320. If the result of block 410 is no, at block 416 a password is requested. A password is requested for manual input by the user as an alternative authentication option when the comparison of the sensor signatures does not automatically indicate that the user should be logged in to the mobile device 316. In response to the request for a password at block 416, the user may provide a password for the mobile device 316. At block 418, it is determined whether the password is correct. If the response to block 418 is no, at block 420 the user is logged off the mobile device 316 because the user cannot be authenticated.

If the response to block 418 is yes, at block 412 an example record 422 of the database 320 of threshold values corresponding to sensors is updated. To enable continuous refining of the threshold value for optimal accuracy, the database 320 is updated based on the success or failure of the comparison using the threshold value. For example, the threshold values reflected in the record 422 may be revised or updated when the comparison of sensor signatures results in satisfaction of the threshold. As another example, the threshold values reflected in the record 422 may be revised or updated when the automatic comparison of sensor signatures does not result in automatic authentication of the user on the mobile device 316 yet manual provision of the password of the user does result in authentication of the user on the mobile device 316. Successful manual provision of passwords to authenticate the user after one or more failed attempts to automatically authenticate the user based on satisfaction of threshold values in comparing sensor signatures may indicate that the threshold values are incorrect or require adjustment.

For example, the record 422 may reflect a type of sensor S_1 having an associated threshold value T_1. If comparison of sensor signatures for the sensor S_1 results in a satisfaction of the threshold value T_1, the threshold value T_1 may be updated (e.g., decreased if the comparison value is much less than T_1). The threshold value T_1 may be updated to reflect the range of the comparison values resulting from successful authentications so that the threshold value T_1 is not so large as to allow authentications in certain circumstances when they are not warranted. In some embodiments, if comparison of sensor signatures for the sensor S_1 results in a satisfaction of the threshold value T_1, each time a comparison of sensor signatures results in satisfaction of the threshold value T_1, the threshold value T_1 may be incrementally tagged or otherwise weighted to reflect the accuracy of the threshold value. If comparison of sensor signatures for the sensor S_1 does not result in satisfaction of the threshold but a user subsequently manually authenticates herself on the mobile device 316, the threshold value T_1 may be updated (e.g., increased) so that more automatic authentications may be performed upon comparison of sensor signatures and fewer manual authentications need be performed. With respect to the sensor S_2, the updating of the threshold value T_2 is identical or similar to the updating of the threshold value T_1 for sensor S_1, as described.

Figure 5:
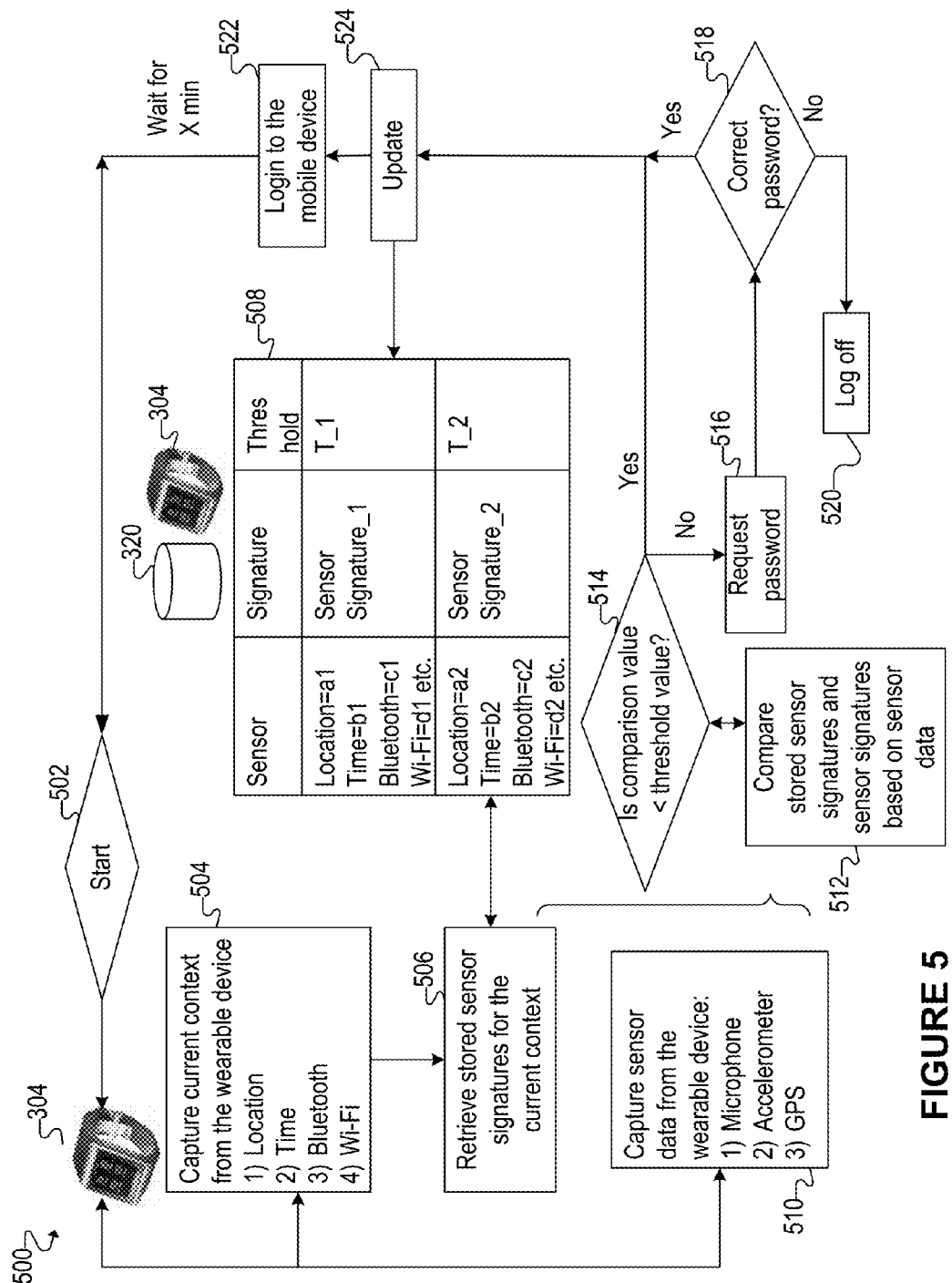
FIG. 5 shows an example method of performing context based authentication in accordance with an embodiment of the present disclosure.

At block 414, the method 400 performs context based authentication, as described in more detail with respect to FIG. 5. From block 414, the method 400 proceeds to block 402 after a delay of a certain amount of time, which can be, for example, X minutes, where X may be any real number, integer, or other desired number. This delay could also be zero, i.e., X may be set to 0 minutes to enable continuous authentication of the user.

FIG. 5 shows an example method 500 of performing context based authentication in accordance with an embodiment of the present disclosure. The steps of the method 500 may be performed by corresponding modules in FIG. 1, as described in more detailed herein. At block 502, the method 500 starts. At block 504, information relating to a current context is captured from the wearable device 304. For example, information relating to the current context may include the user's location, current time, accelerometer and gyroscope data, Bluetooth and Wi-Fi devices in the user's environment. In some embodiments, other types of information relating to context may be used.

At block 506, stored sensor signatures for the current context are retrieved. The stored sensor signatures for the current context may be retrieved from an example record 508 from the database 320 of the wearable device 304. The record 508 may reflect, for example, different contexts. For example, as reflected in the record 508, one context is identified, as indicated by the following: Location=a1, Time=b1, Bluetooth=c1, and Wi-Fi=d1. The context is associated with a sensor signature Sensor Signature_1 and a threshold value T_1. As another example, as reflected in the record 508, another context is identified, as indicated by the following: Location=a2, Time=b2, Bluetooth=c2, and Wi-Fi=d2. The context is associated with a sensor signature Sensor Signature_2 and a threshold value T_2. Other contexts can be similarly reflected in records from the database 320.

At block 510, sensor signals from a microphone, accelerometer, gyroscope, GPS, Bluetooth, and Wi-Fi of the mobile device 316 are captured. The sensor signals captured at blocks 404 and 406 may include those reflected in Table 1 herein. At block 512, sensor signatures associated with the sensor signals from the wearable device 304 and sensor signatures associated with one or more global signatures for the current context are compared. The comparison of sensor signatures may result in a comparison value (that is a representation of the distance between the sensor signatures). At block 514, it is determined whether the comparison value is less than a threshold value associated with the current context. The threshold value represents the maximum distance between any two similar sensor signatures. If the result of the block 514 is no, at block 516 a password of the mobile device 316 is requested. At block 518, it is determined whether the password is correct. If the result of block 518 is no, at block 520 the user is logged off the mobile device 316.

If the result of block 518 is yes, at block 524 the database 320 is updated. If the result of block 514 is yes, at block 524 the record 508 is updated. To enable continuous refining of the threshold value for optimal accuracy, the database 320 may be updated based on the success or failure of the comparison using the threshold value. For example, the threshold value reflected in the record 508 may be revised or updated when the comparison of sensor signatures results in satisfaction of the threshold. As another example, the threshold values reflected in the record 508 may be revised or updated when the automatic comparison of sensor signatures does not result in automatic authentication of the user on the mobile device 316 yet manual provision of the password of the user does result in authentication of the user on the mobile device 316. Successful manual provision of passwords to authenticate the user after one or more failed attempts to automatically authenticate the user based on satisfaction of threshold values in comparing sensor signatures may indicate that the threshold values are incorrect or require adjustment. Refining the threshold value would help in increasing the chances of automatic authentication of the authorized user to her mobile device.

Adjustment of threshold values in the context based authentication is similar to adjustment of threshold values in the interaction based authentication. For example, the record 508 may reflect the threshold value $T\_1$ for a current context. If comparison of sensor signatures for a current context and a global signature for the current context results in a satisfaction of the threshold value $T\_1$, the threshold value $T\_1$ may be updated (e.g., decreased if the comparison value is much lower than $T\_1$). The threshold value $T\_1$ may be updated to reflect the magnitude of the comparison values resulting from successful authentications so that the threshold value $T\_1$ is not so large as to allow authentications in circumstances when they are not warranted. In some embodiments, each time a comparison of sensor signatures for a current context and a global signature for the current context results in satisfaction of the threshold value $T\_1$, the threshold value $T\_1$ may be incrementally tagged or otherwise weighted to reflect the accuracy of the threshold value. If comparison of sensor signatures for a current context and a global signature for the current context does not result in satisfaction of the threshold but a user subsequently manually authenticates herself on the mobile device 316, the threshold value $T\_1$ may be updated (e.g., increased) so that more automatic authentications may be performed upon comparison of sensor signatures and fewer manual authentications need be performed.

From block 522, the method 500 proceeds to block 502 after a delay of a certain amount of time, which can be, for example, X minutes, where X may be any real number, integer, or other desired number. This delay could also be zero, i.e., X may be set to 0 minutes to enable continuous authentication of the user.

Hardware Implementation

Figure 6:
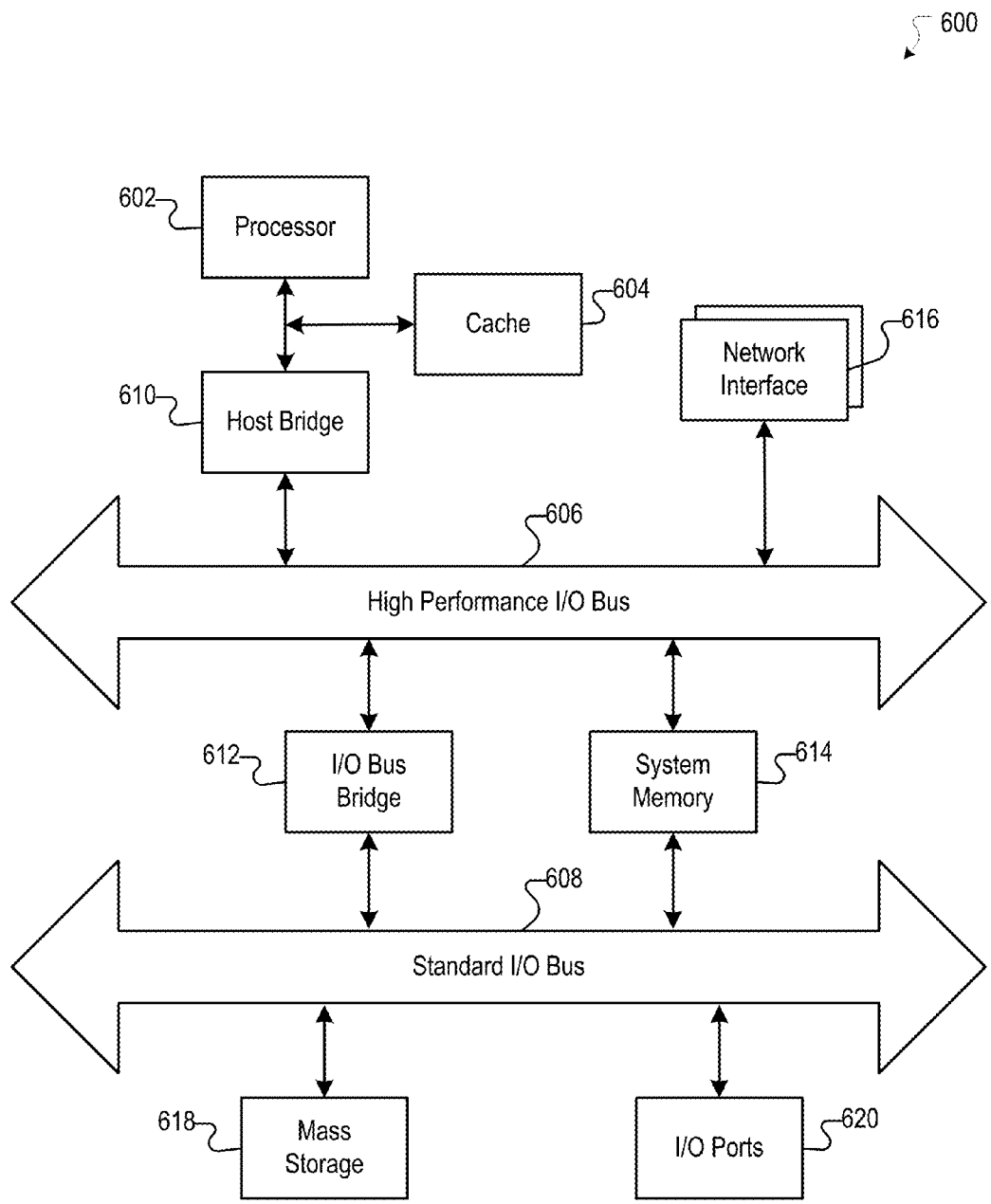
FIG. 6 illustrates an example of a computing device or system that can be used to implement one or more of the embodiments described herein, according to an embodiment of the present disclosure.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be a component of the networking system described herein. In an embodiment of the present disclosure, the computer system 600 may be one server among many that constitutes all or part of a networking system.

The computer system 600 can include a processor 602, a cache 604, and one or more executable modules and drivers, stored on a computer-readable medium, directed to the processes and features described herein. Additionally, the computer system 600 may include a high performance input/output (I/O) bus 606 or a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., ARM processors, Qualcomm processors, as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, Google Android operating system, BSD operating systems, Tizen operating system and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", "example", or the like means that a particular feature, design, structure, or characteristic described in connection with the embodiment or example is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

It should also be appreciated that the specification and drawings are to be regarded in an illustrative sense. It can be evident that various changes, alterations, and modifications can be made thereunto without departing from the broader spirit and scope of the disclosed technology.

Moreover, the language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A system comprising:
   at least one processor; and
   a memory storing instructions that, when executed by the at least one processor, cause the system to perform:
   retrieving a first sensor signature associated with first set of sensor data of a first device in a first context, wherein the first device is a wearable device worn by a user:
   retrieving a second sensor signature associated with a second set of sensor data of a second device, wherein the second device is a mobile device;
   performing a first comparison by comparing the first sensor signature with the second sensor signature;
   determining a first comparison value based on the first comparison between a first sensor signature and the second sensor signature, wherein the sensor data relates to motion of the first device and the second device and is provided by at least one of a GPS sensor, an accelerometer, and a gyroscope;
   determining whether the first comparison value satisfies a first threshold based upon a similarity between the first set of sensor data associated with the first context and the second set of sensor data;

determining the user should be authenticated on the second device based on satisfaction of the first threshold; and providing a password to the second device to authenticate the user on the second device in response to satisfaction of the first threshold;

requesting a password for the second device when the first threshold is not satisfied;

comparing the password for the second device provided in response to the request with a known password;

updating the first threshold when it is determined that the password for the second device provided in response to the request for a password is correct; and causing the user to be automatically logged off the second device in response to the user taking off the wearable device.

2. The system of claim 1, wherein the instructions cause the system to further perform:

determining a second comparison value based on a second comparison between the first sensor signature associated with the first set of sensor data of the first device and a third sensor signature associated with the first context, the second comparison associated with a second authentication type;

determining whether the second comparison value satisfies a second threshold;

determining that the user should be authenticated on the second device based on satisfaction of the second threshold.

3. The system of claim 2, wherein at least one of the first authentication type and the second authentication type is performed at least one of continuously or periodically.

4. The system of claim 2, wherein at least one of the first authentication type and the second authentication type is performed at irregular intervals.

5. The system of claim 2, wherein the instructions cause the system to further perform:

providing a password to the second device to authenticate the user on the second device in response to satisfaction of the second threshold.

6. The system of claim 2, wherein the instructions cause the system to further perform:

providing a command to the second device to log off the user from the second device when the second threshold is not satisfied.

7. The system of claim 2, wherein the instructions cause the system to further perform:

updating the second threshold based on the second comparison value.

8. The system of claim 1, wherein the instructions cause the system to further perform:

providing a command to the second device to log off the user from the second device when the first threshold is not satisfied.

9. The system of claim 1, wherein the instructions cause the system to further perform:

performing the first comparison.

10. The system of claim 1, wherein the instructions cause the system to further perform:

updating the first threshold based at least in part on the first comparison.

11. The system of claim 1, wherein the instructions cause the system to further perform:

determining a third comparison value based on a third comparison between the first sensor signature associated with the first set of sensor data of the first device in the first context and a third sensor signature associated with third set of sensor data of a third device, the third comparison associated with the first authentication type;

determining whether the third comparison value satisfies a third threshold;

determining that the user should be authenticated on the third device based on satisfaction of the third threshold.

12. The system of claim 1, wherein at least one of the first set of sensor data and the second set of sensor data is provided by at least one of a microphone, a galvanic skin response (GSR) sensor, a pressure sensor, a temperature sensor, a Wi-Fi radio, and a Bluetooth radio.

13. The system of claim 1, wherein the instructions cause the system to further perform:

receiving the second set of sensor data from the second device over a communications link including at least one of Wi-Fi, Bluetooth, and NFC.

14. The system of claim 1, wherein the instructions cause the system to further perform:

detecting that the user has worn the first device.

15. A method comprising:

retrieving a first sensor signature associated with first set of sensor data of a first device in a first context, wherein the first device is a wearable device worn by a user;

retrieving a second sensor signature associated with a second set of sensor data of a second device, wherein the second device is a mobile device;

performing a first comparison by comparing the first sensor signature with the second sensor signature;

determining, by a computing system, the first comparison value based on a first comparison between the first sensor signature and the second sensor signature, the first comparison associated with a first authentication type, wherein the sensor data relates to motion of the first device and the second device and is provided by at least one of a GPS sensor, an accelerometer, and a gyroscope;

determining whether the first comparison value satisfies a first threshold based upon a similarity between the first set of sensor data associated with the first context and the second set of sensor data;

determining that the user should be authenticated on the second device based on satisfaction of the first threshold;

providing a password to the second device to authenticate the user on the second device in response to satisfaction of the first threshold;

requesting a password for the second device when the first threshold is not satisfied;

comparing the password for the second device provided in response to the request with a known password;

updating the first threshold when it is determined that the password for the second device provided in response to the request for a password is correct; and causing the user to be automatically logged off the second device in response to the user taking off the wearable device.

16. A non-transitory computer-readable storage medium including instructions that, when executed by at least one processor of a computing system, cause the computing system to perform:

retrieving a first sensor signature associated with first set of sensor data of a first device in a first context, wherein the first device is a wearable device worn by a user;

retrieving a second sensor signature associated with a second set of sensor data of a second device, wherein the second device is a mobile device;

performing a first comparison by comparing the first sensor signature with the second sensor signature;

determining a first comparison value based on the first comparison between the first sensor signature associated with the first set of sensor data of the first device in the first context and the second sensor signature associated with the second set of sensor data of the second device, the first comparison associated with a first authentication type, wherein the sensor data relates to motion of the first device and the second device and is provided by at least one of a GPS sensor, an accelerometer, and a gyroscope;

determining whether the first comparison value satisfies a first threshold based upon a similarity between the first set of sensor data associated with the first context and the second set of sensor data;

determining that the user should be authenticated on the second device based on satisfaction of the first threshold; and providing a password to the second device without manual entry of the password to authenticate the user on the second device in response to satisfaction of the first threshold;

requesting a password for the second device when the first threshold is not satisfied;

comparing the password for the second device provided in response to the request with a known password;

updating the first threshold when it is determined that the password for the second device provided in response to the request for a password is correct; and causing the user to be automatically logged off the second device in response to the user taking off the wearable device.

* * * * *